United States Patent [19]
Hansen

[11] Patent Number: 5,092,752
[45] Date of Patent: * Mar. 3, 1992

[54] SEAL ASSEMBLY FOR A ROTARY DEVICE

[75] Inventor: Craig N. Hansen, Minnetonka, Minn.

[73] Assignee: Hansen Engine Corporation, Minnetonka, Minn.

[*] Notice: The portion of the term of this patent subsequent to Sep. 8, 2004 has been disclaimed.

[21] Appl. No.: 514,542

[22] Filed: Apr. 27, 1990

Related U.S. Application Data

[63] Continuation-in-part of Ser. No. 253,973, Oct. 5, 1988, Pat. No. 4,915,071, which is a continuation of Ser. No. 93,884, Sep. 8, 1987, abandoned.

[51] Int. Cl.$^5$ ............... F04C 18/344; F04C 27/00
[52] U.S. Cl. ................. 418/137; 418/146; 418/148; 418/61.1
[58] Field of Search ............ 418/61.1, 137, 146, 418/148, 120, 121

[56] References Cited

U.S. PATENT DOCUMENTS

| | | | |
|---|---|---|---|
| 1,401,336 | 12/1921 | Johnson | 418/137 X |
| 2,345,561 | 4/1944 | Allen | 418/137 X |
| 3,932,075 | 1/1976 | Jones | 418/121 |
| 4,692,104 | 9/1987 | Hanson | 418/137 X |

*Primary Examiner*—Michael Koczo
*Attorney, Agent, or Firm*—Burd, Bartz & Gutenkauf

[57] ABSTRACT

A seal assembly slidably mounted in a slot in the piston engages the cylindrical internal wall of the housing to form separate chambers. The housing has arcuate slots non-concentric with its cylindrical internal wall accommodating rollers connected to the seal assembly to maintain the seal assembly in constant and substantially uniform sealing engagement with the internal wall of the housing.

30 Claims, 2 Drawing Sheets

SEAL ASSEMBLY FOR A ROTARY DEVICE

CROSS REFERENCE TO RELATED APPLICATION

This application is a continuation-in-part of U.S. application Ser. No. 253,973 filed Oct. 5, 1988, now U.S. Pat. No. 4,915,071, which is a continuation of U.S. application Ser. No. 093,884 filed Sept. 8, 1987, abandoned.

FIELD OF INVENTION

The invention is related to sealing structures used in rotary devices, such as liquid pumps, gas compressors and internal combustion engines.

BACKGROUND OF INVENTION

It is conventional practice to utilize springs to continuously bias the vanes of a rotary engine into sealing engagement with surfaces, such as the inside wall of housings forming the combustion chambers of the engine. Examples of spring biased vanes associated with rotors are shown in U.S. Pat. Nos. 1,242,692; 1,424,977; and 3,572,030. These types of rotary engines have limited operating speeds. Centrifugal forces cause the vanes to move into frictional contact with the inside walls of the housing. This frictional contact causes considerable wear resulting in gas leakage past the vanes and excessive mechanical losses.

Rotary vane-type devices have been used to positively position the vanes during the rotation of the rotors relative to the housings of the devices. The positive positioning of the vanes is achieved through rollers located in continuous cam tracks. Shank et al shows in U.S. Pat. No. 4,299,047, a vane-type rotary device having a rotor with a plurality of vanes. Rollers located in tracks positively control the location of the vanes during the rotation of the rotor. Hansen in U.S. Pat. No. 4,667,468 discloses a rotary internal combustion engine having a plurality of vane and seal assemblies located in sliding sealing engagement with the inside surface of the housing of the engine. The rotary device has positive control of both the rotor and housing vane and seal assemblies to provide effective sliding gas seals between the stationary housing and rotating rotor.

Air compressors having pistons which have controlled movement through eccentrics are shown by Lawton in U.S. Pat. No. 2,423,507 and Jerneas in U.S. Pat. No. 3,221,664. These air compressors have sealed structures interposed between the movable and stationary parts to reduce leakage and enhance compressor efficiency. The engaging parts are subject to high sliding speeds which may result in wear and considerable friction which limit the efficiency and useful life of the compressors.

SUMMARY OF INVENTION

The invention is directed to a seal assembly used in a rotary device, such as an internal combustion engine which utilizes hydrocarbon fuel, such as gasoline, alcohol and the like in an economical and efficient manner. Other types of rotary devices, such as gas compressors and liquid pumps, can use the seal assembly of the invention. The term rotary devices as used herein includes liquid and gas pumps and compressors and internal combustion engines. The internal combustion engine described in U.S. Pat. No. 4,915,071 has a housing having an inner cylindrical wall surrounding a plurality of combustion chambers. A piston having an outer surface in each combustion chamber is surrounded by the housing and supported on a shaft. The shaft has a primary eccentric rotatably supporting the piston. Secondary eccentrics are rotatably mounted on the housing and piston to control the orbit movement of the piston and limit the pistons angular displacement. A plurality of seal assemblies arranged around the piston separate each combustion chamber whereby movement of the piston relative to the combustion chambers provides each combustion chamber with an intake stroke, compression stroke, power stroke, and exhaust stroke. During orbital movement of the piston, the seal assemblies have limited arcuate movement relative to the inner wall of the housing. The piston has a generally radial movement relative to the seal assemblies. Each seal assembly and housing has cooperating structures allowing limited arcuate movement of the seal assembly and restricted radial movement thereof during movement of the piston. The seal assemblies are in continuous and constant sealing engagement with the inner wall of the housing. The seal members of the seal assemblies that engage the inner cylindrical wall of the housing are in relatively low sealing frictional engagement and have low sliding speeds as compared to other seals in constant displacement devices.

The preferred embodiment of the seal assembly usable in a rotary device has a blade associated with the housing to permit arcuate movement of the blade and restrict radial movement thereof during orbital movement of the piston. The housing has a cylindrical inside wall that surrounds a plurality of chambers. The piston has an outer cylindrical face surrounded by the housing. The diameter of the piston is less than the diameter of the inner cylindrical wall of the housing. A body of the seal assembly is located in a generally radial slot in the piston. The piston has a plurality of circumferentially spaced radial slots accommodating a plurality of seal assemblies to provide separate chambers. The circumferential distance between adjacent seal assemblies can be equal or varied to provide selected working volumes or chambers for the device. Each body has an outer end with a transverse groove which accommodates a seal member. The seal member is located in an even and continuous sliding sealing engagement with the inner cylindrical wall of the housing. This engagement is maintained with positioning rollers attached to each blade. The positioning rollers are located in arcuate slots in the end plates of the housing to position the blade on the housing. The length of the radius of the arcuate slots is substantially the same as the length of the radius of the inner cylindrical wall of the housing. The arcuate slots cooperate with the rollers to allow the blade to have limited arcuate movement and restricted radial movement with respect to the housing. This ensures uniform and constant sealing contact between the seal member and the inner cylindrical wall of the housing. The seal member has relatively low sealing frictional engagement with the inner cylindrical wall of the housing and relatively low sliding speeds as compared to other constant displacement devices. The retaining of the body on the housing minimizes the centrifugal force on the seal member and body and thereby reducing sealing friction. This results in an effective seal assembly having a long useful wear life.

Load carriers and side seal assemblies located between the piston and the body space the body from the inside surfaces of the piston providing the grooves and function under varying operating conditions and allow for thermal growth differentials. The side seal assemblies are located in cylindrical grooves in the piston which are open to the slot and face the opposite side surfaces of the body located in the slot. Each side seal assembly has a body member located within a cylindrical groove in the piston. The body member has a longitudinal groove accommodating a free-floating, pressure active seal positioned in sealing contact with a flat side surface of the body, with pressure balanced loading only at a level necessary for a sealing function to reduce wear and friction. The active seal does not serve to position the body in the groove. This function is performed by the body member which has an inner face that engages the side surface of the blade. The body member is free to rotate on the piston so that the face can bear against the body.

These and other advantages of the seal assembly of the invention are shown in the drawing and described in the following detailed description.

DESCRIPTION OF PREFERRED EMBODIMENT

Figure 1:
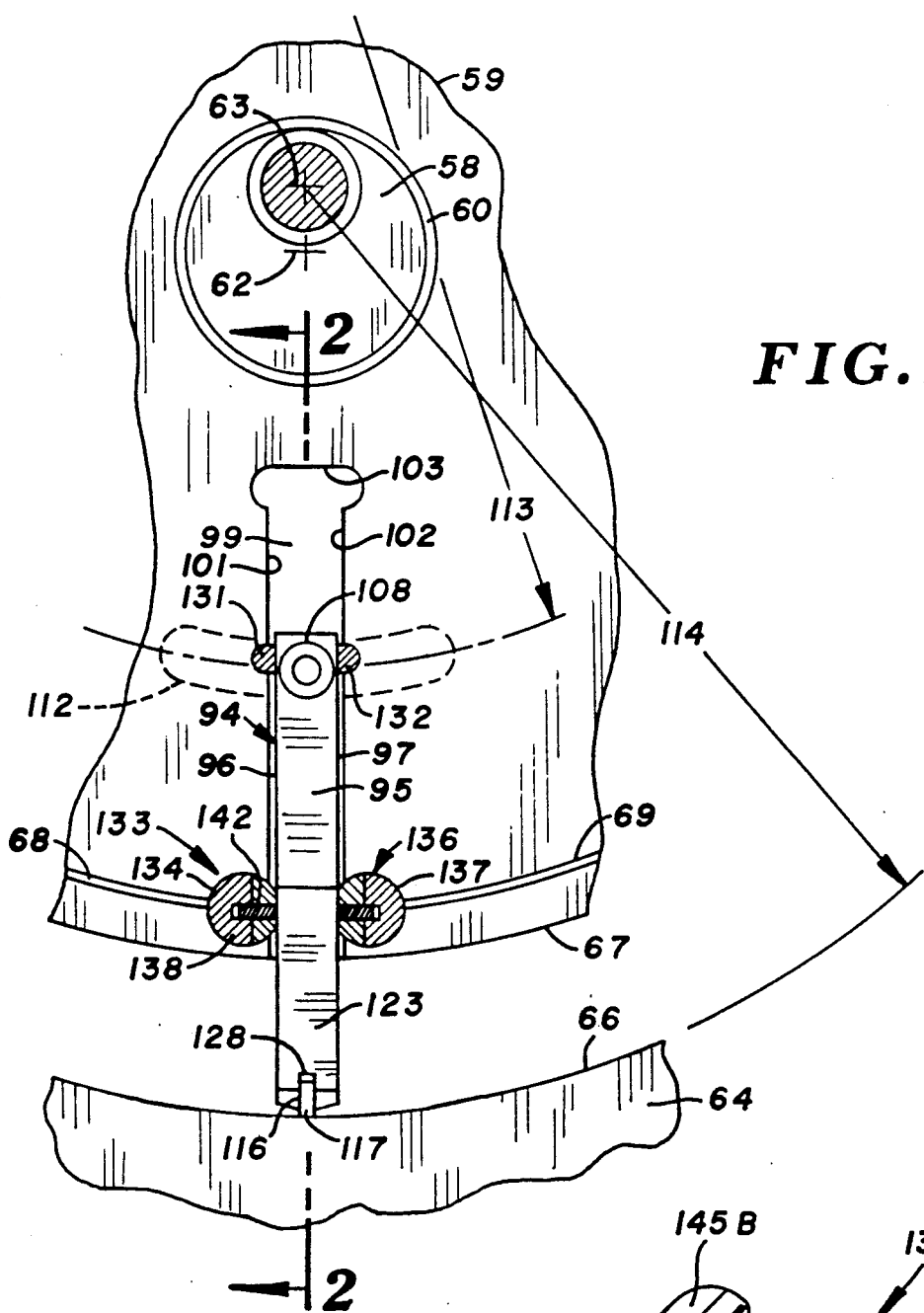
FIG. 1 is an enlarged end view of a seal assembly operatively mounted on a piston having orbital movement of a rotary device.

Referring to FIG. 1, there is shown a piston 59 of a rotary device, such as an internal combustion engine, rotatably mounted on an eccentric 58 secured to a shaft 63. Piston 59 has a central bore accommodating an annular bearing 60 surrounding eccentric 58 allowing piston 59 to have annular movement relative to eccentric 58. Eccentric 58 is a part of the shaft 63 supporting piston 59 on housing 39 and 41 of the rotary device.

Piston 59 is movably associated with a radial seal assembly 94 of the invention. Seal assembly 94 is disposed within a radial slot 99 in piston 59. The slot 99 extends in a radial direction along a line extended through the axis of shaft 63. The outer end of slot 99 is open to the outer peripheral surface 67 of piston 59. As shown in FIG. 1, piston 59 has parallel flat surfaces 101 and 102 forming radial slot 99. Slot 99 has uniform width between flat surfaces 101 and 102.

A plurality of seal assemblies, identical to seal assembly 94, disposed within radial slots (not shown) are used to divide the internal space of the device into separate working volumes or chambers. The number of seal assemblies can vary to thereby change the number of chambers. Seal assembly 94 has moving and sealing components, hereinafter described, that have low sliding speeds and low sealing friction which improves sealing efficiency and wear life thereof.

Figure 2:
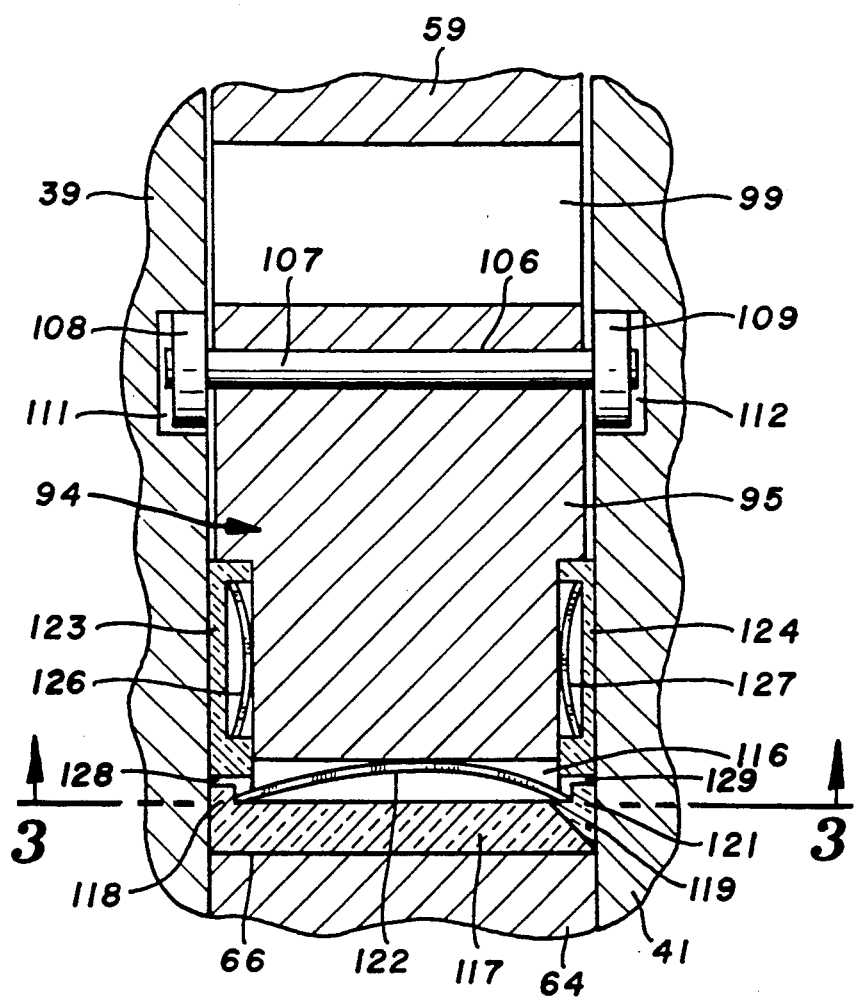
FIG. 2 is an enlarged sectional view taken along line 2—2 of FIG. 1.
Figure 3:
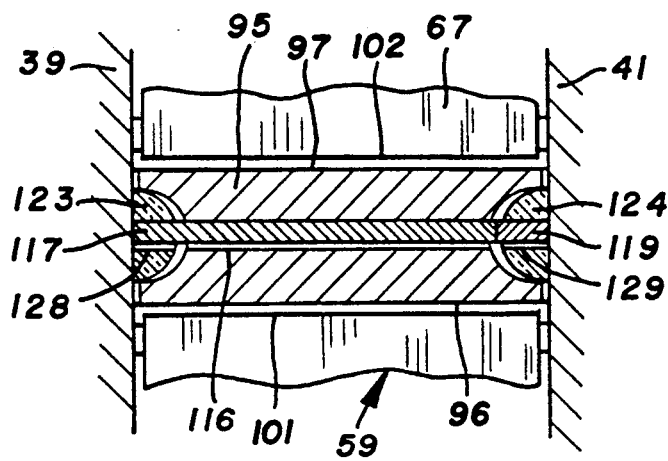
FIG. 3 is an enlarged sectional view taken along line 3—3 of FIG. 2.

Seal assembly 94, as shown in FIGS. 1, 2 and 3, has a generally flat metal body 95 having a transverse hole 106 in the inner end thereof. Body 95 has flat parallel outside surfaces 96 and 97 and uniform thickness or width between these surfaces. Surfaces 96 and 97 are continuous flat surfaces spaced from surfaces 101 and 102 of piston 59. As shown in FIG. 1, body 95 does not frictionally engage piston 59 as body surfaces are spaced from piston surfaces 101 and 102. The support for body 95 on piston 59 is hereinafter described. Body 95 has a length that is slightly shorter than the depth of groove 99 so that body 95 does not bottom on or engage the bottom end 103 of slot 99 during movement of piston 59 relative to body 95.

A cylindrical cross bar or rod 107 extends through hole 106. Rollers 108 and 109 are rotatably mounted on opposite ends on cross rod 107. Body 95 can have lateral projections in lieu of rod 107 to accommodate rollers 108 and 109. Roller 108 is located in an arcuate track or slot 111 in housing plate 39. Roller 109 is located in an arcuate track or slot 112 in housing plate 41. Slots 111 and 112 are in the inside surfaces of plates 39 and 41 and have substantially the same length radii 113 as the radial distance 114 between inner surface 66 of casing 64 and axis 63. In other words, the length of radius 114 of each arcuate slot 111 and 112 is substantially the same as the length of radius 114 of the inner cylindrical wall 66 of the housing of the rotary device. Arcuate slots 111 and 112 are laterally aligned with each other and have the same circumferential length. The arcuate curvatures of slots 111 and 112 are not concentric with the arcuate curvature of inner wall 66 of casing 64. Rollers 108 and 109 function as cam followers that follow the arcuate curvature or track of slots 111 and 112 to ensure constant, continuous and even sliding sealing engagement of a transverse blade seal member 117 of seal assembly 94 with inner cylindrical wall 66 of casing 64 and the inside surfaces of plates 39 and 41. Plates 39 and 41 have additional arcuate slots for additional seal assemblies (not shown) that have the same structure, radius length, and function as slots 111 and 112.

Figure 5:
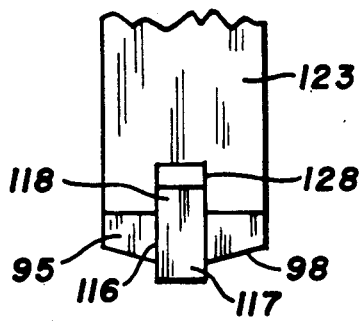
FIG. 5 is an enlarged end view of the outer end of a side seal and transverse seal member of the seal assembly.

As shown in FIG. 1, the outer end of body 95 of seal assembly 94 is chamfered and has a transverse groove 116 accommodating a generally flat or blade seal member 117. As shown in FIG. 5, the outer end of body 95 has tapered surfaces 98 extended inwardly from the outer end of groove 116. Seal member 117 projects outwardly toward casing wall 66 from the outer end of body 95. As seen in FIG. 2, seal member 117 has an inwardly directed shoulder 118 at one end thereof. A generally triangular edge seal 119 is located at the opposite end of member 117. Edge seal 119 has an inwardly directed shoulder 121. Seal members 117 and 119 may be ceramic material. A leaf spring 122 located in groove 116 engages shoulders 118 and 121 and a central portion of body 95 to bias seal member 117 into sealing engagement with the inside cylindrical wall 66 of casing 64 and the inside surface of plate 39 and bias edge seal 119 in engagement with the inside surface of plate 41, respectively. Seal members 117 and 119 have engaging beveled surfaces, as shown in FIG. 2, whereby leaf spring 122 also biases the ends of seal members 117 and 119 into engagement with the inside side walls of plates 39 and 41.

Seal assembly 94 has side seals 123 and 124 in the opposite sides thereof that are biased into engagement with the inside surface of plates 39 and 41 with leaf springs 126 and 127, respectively. As shown in FIG. 3, seals 123 and 124 have at their outer ends slots 128 and 129 that accommodate the outer ends of seal member 117 and edge seal 119, respectively. As shown in FIG. 5, shoulder 118 projects into slot 128 whereby the outer surfaces of shoulder 118 and seal 123 are continuous and prevent passage of fluids past seal assembly 94. Side seals 123 and 124 may be ceramic material.

As shown in FIG. 1, a pair of semi-circular load carriers 131 and 132 are retained in piston 59 and engage opposite side surfaces 96 and 97 of body 95. The outer peripheral portion of piston 59 has a pair of side seal assemblies indicated generally at 133 and 136 that engage opposite side surfaces 96 and 97 of body 95 of seal assembly 94. Side seal assembly 133 is located adjacent segment seal 68 in a generally cylindrical groove or slot 134 facing and open to side 101 of slot 99. Side seal assembly 136 is located adjacent seal 69 in a cylindrical slot 137 facing and open to the opposite side 102 of slot 99. The openings in side surfaces 101 and 102 each have a width less than the diameter of cylindrical seal assembly 133. This holds the seal assemblies 133 and 136 in assembled relation with piston 59 and allows limited rotation of the seal assemblies 133 and 136 relative to piston 59. Body 95 is positioned in slot 99 and retained in spaced relation with side surfaces 101 and 102 of piston 59 with load carriers 131 and 132 and seal assemblies 133 and 136.

Figure 4:
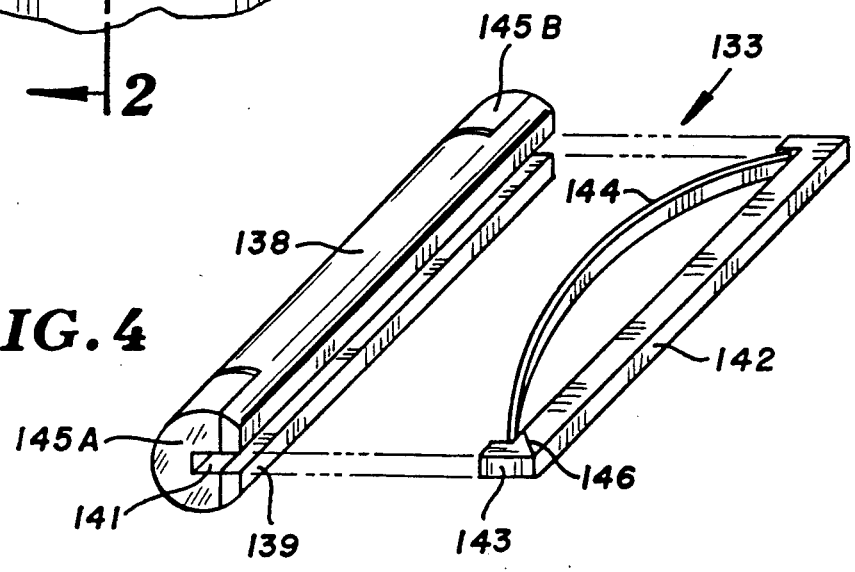
FIG. 4 is an exploded perspective view of a side seal of the seal assembly.

Referring to FIG. 4, there is shown side seal assembly 133. Side seal assembly 136 has identical structure. Side seal assembly 133 has a body 138 having an outer arcuate surface that extends to a flat outer face 139. A longitudinal groove 141 is open to face 139 and accommodates a bar seal 142 and edge seal 143. A leaf spring 144 located in groove 141 engages bar seal 142 and edge seal 143 to bias them in an outward direction to maintain sealing engagement with the side of the body of seal assembly 94. Bar seal 142 and edge seal 143 have engaging beveled surfaces 146, as shown in FIG. 4, whereby leaf spring 144 also biases the ends of seals 142 and 143 into engagement with the inside walls of plates 39 and 42. Semi-circular sealing members 145A and 145B are located in recesses in opposite ends of body 138. Members 145A and 145B have outer arcuate surfaces that are slightly smaller than the outer arcuate surface of body 138 to allow sealing contact with the inside side walls of plates 39 and 41. The outer arcuate surfaces of body 138 and semi-cylindrical members 145A and 145B allow limited angular movement of side seal assembly 133 in piston 59. A disc or coil spring (not shown) located in each recess of body 138 engage semi-cylindrical members 145A and 145B to bias them into sealing engagement With the inside surfaces of plates 39 and 41, respectively. Bar seal 142 and edge seal 143 comprise a free-floating, pressure active seal which can move into and out of groove 141. Preferably, spring 144 biases bar seal 142 and edge seal 143 at the minimum level required to maintain sealing engagement with seal assembly 94. This minimizes friction and wear of seals 142 and 143 and blade 94. Body 138 and bearing members 145A and 145B function to position the outer end of body 95 within radial slot 99. The flat outer face 139 of body 138 bears fully against the side surface 90 of body 95 avoiding line contact wear. This makes the use of dry-lubricant materials more feasible.

The seal assembly 94 located in slot 99 of piston 59 with load carriers 131 and 132 and seal assemblies 133 and 136 functions under varying operating temperatures as the side seal assemblies 133 and 136 accommodate thermal growth differential between the material of the piston and the material of the seal assemblies. The seal assemblies 133 and 134 also allow the use of liberal fabrication tolerances. The bar seal 142 and edge seal 143 can translate within slot 141 and is maintained in sliding sealing contact with the side surface 96 of body 95 with leaf spring 144. The bar seal 142 does not serve to position body 95 relative to piston 59. This function is performed by the segmented bodies 138 located in the cylindrical grooves 134 and 137 in piston 59 as seen in FIG. 1. The separation of the sealing and load reaction functions has significant implications. The cylindrical body 138 is free to rotate relative to piston 59 so that the flat contacting surface 139 can fully bear against the side of blade 94. The resulting distributed load reduces wear by avoiding line contact. The area exposed to pressure on bar seal 142 and edge seal 143 produces controlled, predictable unit loads for effective sealing. There is no tendency to unseat the bar seal 142 and end seal 143 during lateral movement of blade 94. The mass dynamics of bar seal 142 and edge seal 143 allows for rapid movement to maintain the sealing function. The heavier segmented body 134 having a larger mass is slower to respond to changes in movements. The sealing and vane load reaction functions are achieved close to the outer peripheral surface 67 of piston 59. This location limits the pressure/loaded area of seal assembly 94 and reduces the associated blade load reactions. The outer location of the side seal assemblies 133 and 136 extends the distance between the load-reaction components from the cantilever loading of seal assembly 94.

Seal assembly 94 is in substantially constant and uniform sealing engagement with the inner wall 66 of casing 64 thereby continuously separating the chambers. Seal member 117 is maintained in sliding frictional contact with wall 66 and has limited arcuate movement relative thereto during orbit motion of piston 59. Seal assembly 94 is anchored to housing end plates 39 and 41 through the cooperating means of arcuate slots 111 and 112 and the ends of cross rod 107 and rollers 108 and 109 thereon located in the slots 111 and 112. This ensures the constant and uniform sealing engagement of seal member 117 with inner wall 66 of casing 64. All of the seal assemblies, such as seal assembly 94, are located in circumferentially spaced, generally radial slots in piston 59. so that the piston moves relative to the seal assemblies. This minimizes the centrifugal force on the seal assembly 94 thereby reducing the variations in the sealing loads on the seal member 117. The seal assemblies have low sliding speeds and low sealing friction. This improves the compression and combustion efficiency as well as the wear life of the seal assemblies.

While there is shown and described one embodiment of the seal assembly of the invention, it is understood that changes in the structure and arrangement of structure can be made by those skilled in the art without departing from the invention. The invention is defined in the following claims.

I claim:

1. A seal assembly for use with a rotary device and inside side walls having a housing with an inner cylindrical wall surrounding a chamber, a piston located within said chamber, said piston having spaced side surfaces providing at least one radial slot and eccentric means movably mounting the piston on the housing, said housing having side walls located adjacent opposite sides of the piston, said side walls having arcuate transversely aligned slots open to opposite sides of the piston and spaced radially inward of said cylindrical inner wall, each of said slots having a radius length that is substantially the same length as the radius of the cylindrical inner wall wherein: said seal assembly has at least one body located in the radial slot of the piston, said body having opposite flat side surfaces and a width less than the width of the radial slot, load carrier means mounted on the piston and projected into said radial slot, side seal means mounted on the piston spaced from the load carrier means, said load carrier means and side seal means being engageable with the body to space the body from the side surfaces of the piston providing said radial slot, rod means attached to said body having opposite ends projected into said arcuate transversely aligned slots to allow the body to have limited arcuate movement and restricted radial movement thereof, said body having opposite side ends and an outer end, seal means mounted on the outer end of the body engageable with said cylindrical inner wall, said seal means being maintained in sealing engagement with said cylindrical inner wall during movement of the piston in the chamber with said ends of the rod means following the arcuate slots, and side seal members on the opposite side ends of the body engageable with said inside side walls of the housing, said side seal members having outer ends cooperating with the seal means to maintain the sealing relationship between the body, cylindrical inner wall, and inside side walls of the housing.

2. The seal assembly of claim 1 including: first biasing means engageable with the body and seal means to bias the seal means into engagement with the cylindrical inner wall, and second biasing means engageable with the body and side seal members to bias the side seal members into engagement with the side walls of the housing.

3. The seal assembly of claim 1 wherein: said body has an inner end and an outer end, said rod means being secured to the inner end of the body.

4. The seal assembly of claim 1 including: roller means mounted on the ends of the rod means, said roller means being located in said arcuate slots.

5. The seal assembly of claim 1 wherein: said outer ends of the side seal members have slots accommodating opposite end portions of the seal means 6. The seal assembly of claim 5 wherein: said body has a transverse groove in the outer end thereof, said seal means being located in said groove, first biasing means located in said groove engageable with said body and seal means to bias the seal means into engagement with the cylindrical inner wall, and second biasing means engageable with opposite side ends of the body and side seal members to bias the side seal members into engagement with the side walls of the housing.

7. The seal assembly of claim 1 wherein: said body has a transverse groove in the outer end thereof, said seal means comprises a blade seal member and an edge seal partly located within said groove, said seal member and edge seal having beveled engaging surfaces, and biasing means engageable with the body, seal member and edge seal to bias the seal member and edge seal into engagement with the cylindrical inner wall and inside side walls of the housing.

8. The seal assembly of claim 7 wherein: said biasing means comprises a leaf spring having a first end engageable with the seal member and a second end engageable with the edge seal.

9. The seal assembly of claim 7 wherein: the opposite side ends of the body have recesses, said side seal members being partly located within said recesses, and biasing means located within said recesses engageable with the body and side seal members to bias the side seal members into engagement with the inside side walls of the housing.

10. The seal assembly of claim 9 wherein: said outer ends of the side seal members have slots accommodating opposite ends of the seal means.

11. The seal assembly of claim 1 wherein: the body has generally flat side surfaces, said piston having cylindrical grooves open to opposite sides of the radial slot, said side seal means being located in said cylindrical grooves engageable with opposite side surfaces of the body.

12. The seal assembly of claim 11 wherein: each of the side seal means includes a body member having an outer arcuate surface located within a cylindrical groove and an outer face having a longitudinal groove, bar seal means partly located in said longitudinal groove engageable with a flat side surface of the body, and biasing means located in said longitudinal groove engageable with said bar seal means to bias the bar seal means into engagement with the flat side surface of the body.

13. The seal assembly of claim 12 including: semi-circular bearing members mounted on opposite ends of the body member located in said cylindrical groove to allow limited angular movement of the side seal means relative to the piston.

14. The seal assembly of claim 12 wherein: the side seal means includes a bar seal and an edge seal, said bar seal and edge seal having engaging beveled surfaces, and biasing means engageable with the body, bar seal and edge seal to bias the bar seal and edge seal into engagement with the flat side surface of the body and inside side walls of the housing.

15. The seal assembly of claim 14 wherein: the biasing means includes a leaf spring located in the longitudinal groove having a first end engageable with the bar seal and a second end engageable with the edge seal.

16. The seal assembly of claim 1 wherein: said body has a transverse groove in the outer end thereof, said seal mean comprises a blade seal member and an edge seal partly located within said groove, said seal member and edge seal having beveled engaging surfaces, first biasing means engageable with the body, seal member and edge seal to bias the seal member and edge seal into engagement with the cylindrical inner wall and inside side walls of the housing, said opposite side ends of the body have recesses, said side seal members being partly located within said recesses, second biasing means located within said recesses engageable with the body and side seal members to bias the side seal members into engagement with the inside side walls of the housing, said body having generally flat side surfaces, said piston having cylindrical grooves open to opposite sides of the slot accommodating the body, said side seal means located in said cylindrical grooves engageable with opposite side surfaces of the body, said side seal means including a body member having an outer arcuate surface located within a cylindrical groove and an outer face having a longitudinal groove, bar seal means partly located in said longitudinal groove, engageable with a flat side surface of the body, and third biasing means located in said longitudinal groove engageable with said bar seal means to bias the bar seal means into engagement with the flat side surface of the body.

17. The seal assembly of claim 16 including: semi-circular bearing members mounted on opposite ends of the body member located in said cylindrical groove to allow limited angular movement of the bar seal means relative to the piston.

18. The seal assembly of claim 16 wherein: the bar seal means includes a bar seal and an edge seal, said bar seal and edge seal having engageable bevel surfaces, said third biasing means engageable with the body, bar seal and edge seal to bias the bar seal and edge seal into engagement with the flat side surface of the body and inside side walls of the housing.

19. A seal assembly for use with a rotary device having a housing with an inner cylindrical wall and side walls having transversely aligned arcuate slots open to the chamber and spaced radially inward of the cylindrical inner wall surrounding a chamber, a piston located within said chamber, said piston having at least one radial slot, and eccentric means movably mounting the piston on the housing wherein: said seal assembly has at least one body located in each radial slot in the piston, load carrier means and first seal means mounted in the piston for positioning said body in said radial slot in the piston, second seal means mounted on the body engageable with the inner cylindrical wall, said piston having generally cylindrical slots open to opposite sides of the radial slots, said first seal means located in said cylindrical slots engageable with opposite sides of the body, cross bar means attached to said body, said cross bar means having opposite ends projected into transversely aligned arcuate slots whereby said first seal means and arcuate slots allow the body to have limited arcuate movement and restricted radial movement thereof and maintain the second seal means in sealing engagement with said cylindrical inner wall during movement of the piston in the chamber.

20. The seal assembly of claim 19 wherein: said body has an outer end having a groove extended along the width thereof, said second seal means located in said groove engageable with said inner cylindrical wall, and biasing means located in said groove for moving the second seal means out of the groove in sealing relation with the cylindrical inner wall.

21. The seal assembly of claim 19 wherein: said radial slot is generally aligned with one of the arcuate slots.

22. The seal assembly of claim 19 wherein: said body has side ends, and third seal means mounted on said side ends engageable with said side walls of the housing.

23. The seal assembly of claim 19 wherein: the outer end of the body has a groove, said second seal means being located in said groove engageable with said cylindrical wall, said third seal means have outer ends with grooves accommodating opposite ends of the second seal means, and biasing means located in said grooves acting on the second and third seal means to move the second and third seal means out of the grooves.

24. The seal assembly of claim 23 wherein: said body has side ends having recesses, and said second seal means including seal members located in said recesses and engageable with said inside side walls of the housing.

25. The seal assembly of claim 19 wherein: said body has side ends and a groove in the outer end thereof, said second seal means located within said groove in the outer end thereof engageable with said cylindrical wall, and seal members mounted on the side ends engageable with the housing.

26. The seal assembly of claim 25 including: first biasing means located in said groove to bias the second seal means out of the groove into engagement with said cylindrical wall, and second biasing means engageable with the side ends of the blade and seal members to bias the seal members into engagement with said housing.

27. A side seal assembly for use with a rotary device having a housing with a chamber, a piston located within said chamber, said piston having at least one radial slot, means movably mounting the piston on the housing, and body means having flat side surfaces movably located within said slot wherein: said piston has cylindrical grooves open to opposite sides of said slot, side seal means located within said cylindrical grooves engageable with opposite sides of the body means, each of said side seal means having a body member with an outer arcuate surface located within a cylindrical groove and an outer face having a longitudinal groove, bar seal means partly located within said longitudinal groove engageable with the flat side surface of the body means, and biasing means located within said longitudinal groove engageable with said bar seal means to bias the bar seal means into engagement with the flat side surface of the body means.

28. The side seal assembly of claim 27 including: semi-circular sealing members mounted on opposite ends located in said cylindrical groove to allow sealing contact against the inner side walls of the housing, and limited angular movement of the side seal means relative to the piston.

29. The side seal assembly of claim 27 wherein: the side seal means includes a bar seal and an edge seal, said bar seal and edge seal having engaging bevel surfaces, and biasing means engageable with the body, bar seal and edge seal to bias the bar seal and edge seal into engagement with the flat side surface of the blade and inside side walls of the housing.

30. The side seal assembly of claim 29 wherein: the biasing means includes a leaf spring located in the longitudinal groove having a first end engageable with the bar seal and a second end engageable with the edge seal.

* * * * *